US010642828B2

(12) United States Patent
Tabak et al.

(10) Patent No.: US 10,642,828 B2
(45) Date of Patent: May 5, 2020

(54) SEARCHABLE ENCRYPTION SCHEME WITH EXTERNAL TOKENIZER

(71) Applicant: SAP SE, Walldorf (DE)

(72) Inventors: Ami Tabak, Rosh HaAyin (IL); Roopang Chauhan, Bangalore (IN); Gangadhar Mavuru, Visakhapatnam (IN); Karan Sasan, Raisinghnagar (IN)

(73) Assignee: SAP SE, Walldorf (DE)

( * ) Notice: Subject to any disclaimer, the term of this patent is extended or adjusted under 35 U.S.C. 154(b) by 240 days.

(21) Appl. No.: 15/728,738

(22) Filed: Oct. 10, 2017

(65) Prior Publication Data

US 2019/0108255 A1   Apr. 11, 2019

(51) Int. Cl.
*G06F 16/00* (2019.01)
*G06F 16/2452* (2019.01)
*G06F 21/60* (2013.01)
*G06F 21/62* (2013.01)
*G06F 16/9535* (2019.01)
*G06F 16/245* (2019.01)

(52) U.S. Cl.
CPC ........ *G06F 16/2452* (2019.01); *G06F 16/245* (2019.01); *G06F 16/9535* (2019.01); *G06F 21/602* (2013.01); *G06F 21/6245* (2013.01)

(58) Field of Classification Search
CPC ............. G06F 16/2452; G06F 16/9535; G06F 21/602; G06F 21/6245
USPC ........................................................ 707/759
See application file for complete search history.

(56) References Cited

U.S. PATENT DOCUMENTS

| 6,647,380 | B1* | 11/2003 | Yotsukura | G06Q 10/087 |
| 8,813,243 | B2* | 8/2014 | Parkinson | G06F 21/33 380/1 |
| 2003/0046572 | A1* | 3/2003 | Newman | G06F 21/6227 713/193 |
| 2003/0123671 | A1* | 7/2003 | He | H04L 9/0825 380/282 |
| 2004/0255133 | A1* | 12/2004 | Lei | G06F 21/6227 713/193 |
| 2006/0053112 | A1* | 3/2006 | Chitkara | G06F 21/6227 |
| 2006/0074881 | A1* | 4/2006 | Vembu | G06F 16/25 |
| 2008/0077803 | A1* | 3/2008 | Leach | G06F 21/602 713/189 |
| 2009/0249082 | A1* | 10/2009 | Mattsson | G06F 21/6218 713/193 |

(Continued)

*Primary Examiner* — Thanh-Ha Dang
(74) *Attorney, Agent, or Firm* — Buckley, Maschoff & Talwalkar LLC

(57) ABSTRACT

A server receives a first query to perform one or more operations on an encrypted database and intercepts the first query. A set of data referenced by the first query is determined to include data that is to be encrypted. Based on metadata, one or more data columns of the data that is to be encrypted are identified as well as an encryption scheme to be applied to each of the data columns. Each of the identified data columns is encrypted based on the identified encryption scheme to produce encrypted data. One or more of the operations of the first query is determined to be unsupported on encrypted data. The one or more operations are executed on a token vault at a tokenizer to retrieve token data referencing the encrypted data. The first query is replaced with a modified query based on the retrieved token data. The modified query is executed on the encrypted database to retrieve an encrypted query result.

17 Claims, 6 Drawing Sheets

(56) References Cited

U.S. PATENT DOCUMENTS

| | | | | |
|---|---|---|---|---|
| 2011/0270857 A1* | 11/2011 | Bommireddipalli | .... | H04L 67/10 |
| | | | | 707/758 |
| 2011/0307710 A1* | 12/2011 | McGuire | ............. | G06F 21/6263 |
| | | | | 713/183 |
| 2013/0279748 A1* | 10/2013 | Hastings | .................. | G06K 9/46 |
| | | | | 382/103 |
| 2014/0090081 A1* | 3/2014 | Mattsson | ............ | G06F 21/6218 |
| | | | | 726/27 |
| 2015/0039901 A1* | 2/2015 | Freeman | ............... | G06F 21/602 |
| | | | | 713/189 |
| 2016/0140179 A1* | 5/2016 | Yuen | .................. | G06F 16/2455 |
| | | | | 707/769 |
| 2016/0292430 A1* | 10/2016 | Antonopoulos | ...... | G06F 16/951 |
| 2016/0328462 A1* | 11/2016 | Dinker | ................. | G06F 16/214 |
| 2017/0060776 A1* | 3/2017 | Shimonek | ............. | H04L 9/0816 |
| 2017/0308576 A1* | 10/2017 | Brodsky | ............. | G06F 16/2455 |
| 2017/0308580 A1* | 10/2017 | Naganuma | ............. | H04L 9/008 |
| 2017/0322977 A1* | 11/2017 | Naganuma | .......... | G06F 16/9024 |
| 2017/0344646 A1* | 11/2017 | Antonopoulos | ........ | H04L 9/008 |

\* cited by examiner

SEARCHABLE ENCRYPTION SCHEME WITH EXTERNAL TOKENIZER

BACKGROUND

Nearly every organization acquires, processes, and stores highly sensitive records. Among these records is personally identifiable information (PII) about its customers, employees, patients, students, and other individuals. Organizations are expected to closely guard this private data secure and manage access appropriately. Other concerns include data leakage, either by accident or by malicious intent, and by privileged insiders or by malicious outsiders, which can lead to loss of sensitive data, identity theft, and financial loss. For example, one challenge facing organizations is how to protect against deliberate internal attacks on the organization's data systems by trusted internal users (e.g., highly privileged administrators such as database administrators ("DBAs")), while still allowing those users to perform their jobs.

There is a legal and consumer-wide requirement to encrypt sensitive data (e.g., PII data) that is stored, for example, in relational databases. However, encryption tends to break applicative logic (e.g., application/user functions such as search, sort, etc.), resulting in functionality loss. One such functionality loss is in pattern searches such as LIKE % xx %, CONTAINS, and REGEX searches. In addition, current encryption schemes do not support order preserving and/or pattern matching.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1:
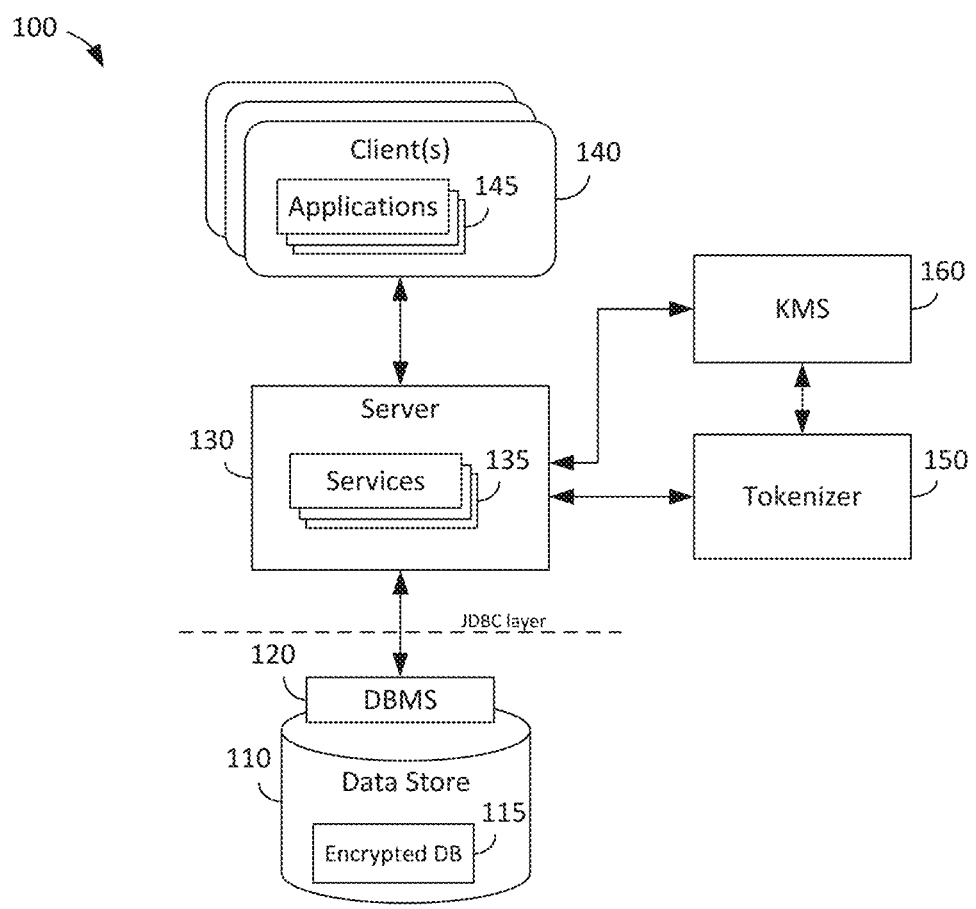
FIG. 1 is a block diagram of an overall system architecture according to some embodiments.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

The disclosed embodiments relate to secure handling of personally identifying information (PII) (or more generally, any user sensitive information), and more specifically, to a searchable encryption scheme with an external tokenizer. The searchable encryption scheme facilitates searching on encrypted data in a cloud-based storage environment or other storage environment. The searchable encryption scheme provides for the ability to preserve application/user functions such as search, sort, etc. in queries made against a relational database in a manner that maintains data security (e.g., data stored "at rest" remains encrypted).

For the purposes of this disclosure, PII data is information that can be used to uniquely identify an individual. In some embodiments, an individual may be a person, an organization, a group, and/or business entity. In some implementations, an individual can be a collection of individuals. PII data may also encompass information that can be used to contact or locate the individual or information that can be used with other sources to identify, contact, or locate the individual. Various laws and regulations to address PII data security exist and vary across geo-political boundaries. Examples of PII data could include name, address, telephone number, birthdate, birthplace, biometric data, email address, Social Security number, passport number, driver's license number, session initiation protocol uniform resource identifier (SIP URI), credit card number, bank account number, a username, an account name, and/or other suitable data that can be used to identify, contact, and/or locate the individual.

The disclosed embodiments relate to an encryption scheme that does not require code changes in the application (e.g., supports legacy software) and supports interdependencies among the system. Processes according to the disclosed embodiments are implemented at a Java Database Connectivity ("JDBC") layer. A database client API, for example, a JDBC API, provides a mechanism to establish a connection to a database and interact with the connected database using SQL statements. The JDBC layer is the endpoint before reaching out to the database. Advantageously, the JDBC layer is not part of application logic. Thus, the application logic is not changed, obviating the need for modification of the application code.

For the purposes of this disclosure, the DBAs, as database administrators, DBAs have access to an application database, but do not have access to application servers. This separation of roles ensures that the DBA will not will not have access to PII data (or more generally, any user sensitive information) in plaintext form and can see only protected data in encrypted form. Plaintext refers to the original, unencrypted data.

FIG. 1 is a block diagram of an overall system architecture 100 according to some embodiments. Embodiments are not limited to architecture 100.

Architecture 100 includes data store 110, database management system (DBMS) 120, server 130, services 135, clients 140, applications 145, tokenizer 150, and key management store (KMS) 160. Generally, services 135 executing within server 130 receive requests (e.g., queries) from applications 145 executing on clients 140 and provides results to applications 145 based on data stored within data store 110.

More specifically, server 130 may execute and provide services 135 to applications 145. Services 135 may comprise server-side executable program code (e.g., compiled code, scripts, etc.) which provide functionality to applications 145 by providing user interfaces (e.g., in eXtended Markup Language (XML), HyperText Markup Language (HTML) and/or JavaScript) to clients 140, receiving requests from applications 145, retrieving data from data store 110 based on the requests, processing the data received from data store 110, and providing the processed data to applications 145. Services 135 may be made available for execution by server 130 via registration and/or other procedures which are known in the art.

In one specific example, a client 140 executes an application 145 to present a user interface to a user on a display of the client 140. The user operates the user interface to request certain data, and the application 145 passes a query based on the request to one of services 135. An SQL script is generated based on the query and forwarded to DBMS 120. DBMS 120 executes the SQL script to return a result set based on data of data store 110, and the application 145 generates and displays a report/visualization based on the result set.

The above operation may leverage a set of objects defined by metadata stored within data store 110 and/or a separate metadata repository (not shown). The metadata is used to execute the query with respect to the corresponding physical entities (e.g., a physical database table, associated columns of one or more database tables, etc.) of data store 110.

Server 130 provides any suitable protocol interfaces through which applications 145 executing on clients 140 may communicate with services 135 executing on application server 130. For example, server 130 may include a HyperText Transfer Protocol (HTTP) interface supporting a transient request/response protocol over Transmission Control Protocol (TCP), and/or a WebSocket interface supporting non-transient full-duplex communications between server 130 and any clients 140 which implement the WebSocket protocol over a single TCP connection.

One or more services 135 executing on server 130 may communicate with DBMS 120 using database management interfaces such as, but not limited to, Open Database Connectivity (ODBC) and Java Database Connectivity (JDBC) interfaces. These types of services 135 may use Structured Query Language (SQL) to manage and query data stored in data store 110.

DBMS 120 serves requests to query, retrieve, create, modify (update), and/or delete data of data store 110, and also performs administrative and management functions. Such functions may include snapshot and backup management, indexing, optimization, garbage collection, and/or any other database functions that are or become known. DBMS 120 may also provide application logic, such as database procedures and/or calculations, according to some embodiments. This application logic may comprise scripts, functional libraries and/or compiled program code.

Data store 110 may comprise any query-responsive data source or sources that are or become known, including but not limited to a structured-query language (SQL) relational database management system. Data store 110 may comprise a number of databases, one or more of which may be an encrypted database 115. Data store 110 may comprise a relational database, a multi-dimensional database, an eXtendable Markup Language (XML) document, or any other data storage system storing structured and/or unstructured data. The data of data store 110 may be distributed among several relational databases, dimensional databases, and/or other data sources. Embodiments are not limited to any number or types of data sources.

In some embodiments, the data of data store 110 may comprise one or more of conventional tabular data, row-based data, column-based data, and object-based data. Moreover, the data may be indexed and/or selectively replicated in an index to allow fast searching and retrieval thereof. Data store 110 may support multi-tenancy to separately support multiple unrelated clients by providing multiple logical database systems which are programmatically isolated from one another.

Data store 110 may implement an in-memory database, in which a full database is stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Each of clients 140 may comprise one or more devices executing program code of an application 145 for presenting user interfaces to allow interaction with application server 130. The user interfaces of applications 145 may comprise user interfaces suited for reporting, data analysis, and/or any other functions based on the data of data store 110.

Presentation of a user interface may comprise any degree or type of rendering, depending on the type of user interface code generated by application server 130. For example, a client may execute a Web browser to request and receive a Web page (e.g., in HTML format) from application server 210 via HTTP, HTTPS, and/or WebSocket, and may render and present the Web page according to known protocols. One or more of clients may also or alternatively present user interfaces by executing a standalone executable file (e.g., an .exe file) or code (e.g., a JAVA applet) within a virtual machine.

Tokenizer 150 maps plaintext strings to encrypted values and stores the mapping in an in-memory database (e.g., token vault), in which a full database is stored in volatile (e.g., non-disk-based) memory (e.g., Random Access Memory).

In some embodiments, for example, tokenizer 150 receives PII data from server 130, generates a token, and encrypts the PII data. A token vault of tokenizer 150 stores the PII data in encrypted form, together with the corresponding token. A token is a reference (e.g., identifier) that maps back to encrypted data and/or original plaintext data through the tokenizer. There is no mathematical relationship between a token and original plaintext data. Therefore, tokens may be safely used throughout architecture 100.

In some embodiments, tokenizer 150 consists of one in-memory database schema per customer, for example, a schema having a single table with the following columns: TableName, ColumnName, PlainText, and EncryptedValue. Queries are executed on the in-memory database. Alternatively, tokenizer 150 supports multi-tenant customers where the customer ID is the primary entity governing data partitioning.

Tokenizer 150 supports SQL "LIKE" queries and other SQL operations (e.g., range queries, aggregation queries, etc.), which may be executed on plaintext values in the token vault. The encrypted values are retrieved using the plaintext to encrypted value mapping in the token vault. The retrieved encrypted values may be looked up (e.g., using an or "IN" or equals operator) in encrypted DB 115 to retrieve the rows.

KMS 160 securely manages customer-specific encryption keys for encryption and decryption. KMS 160 exposes application programming interfaces (APIs) to perform key management operations such as getKey, generateKey, and expireKey, etc.

In some embodiments, customer keys are maintained separate from the encryption engine and data. Key operations are performed outside the database 110 in an external (e.g., third party) KMS 160. Additionally or alternatively, the keys may be on the same cloud platform, locally within the data center, or on a different cloud. In this way, key management is external and independent of the database, and thus removed from DBA control (e.g., preventing data from being decrypted by DBAs).

Figure 2:
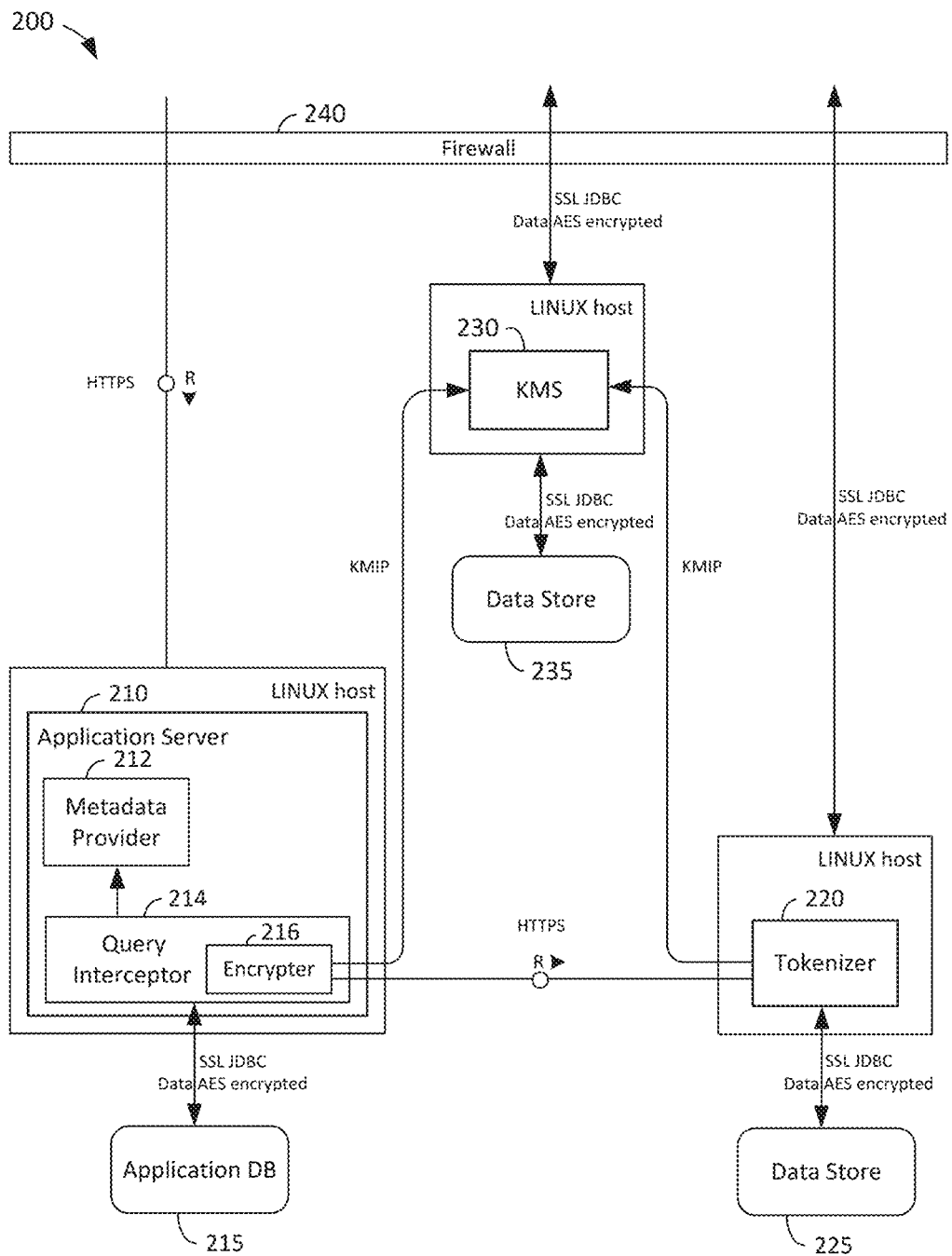
FIG. 2 is a block diagram of a data center architecture according to some embodiments.
Figure 3:
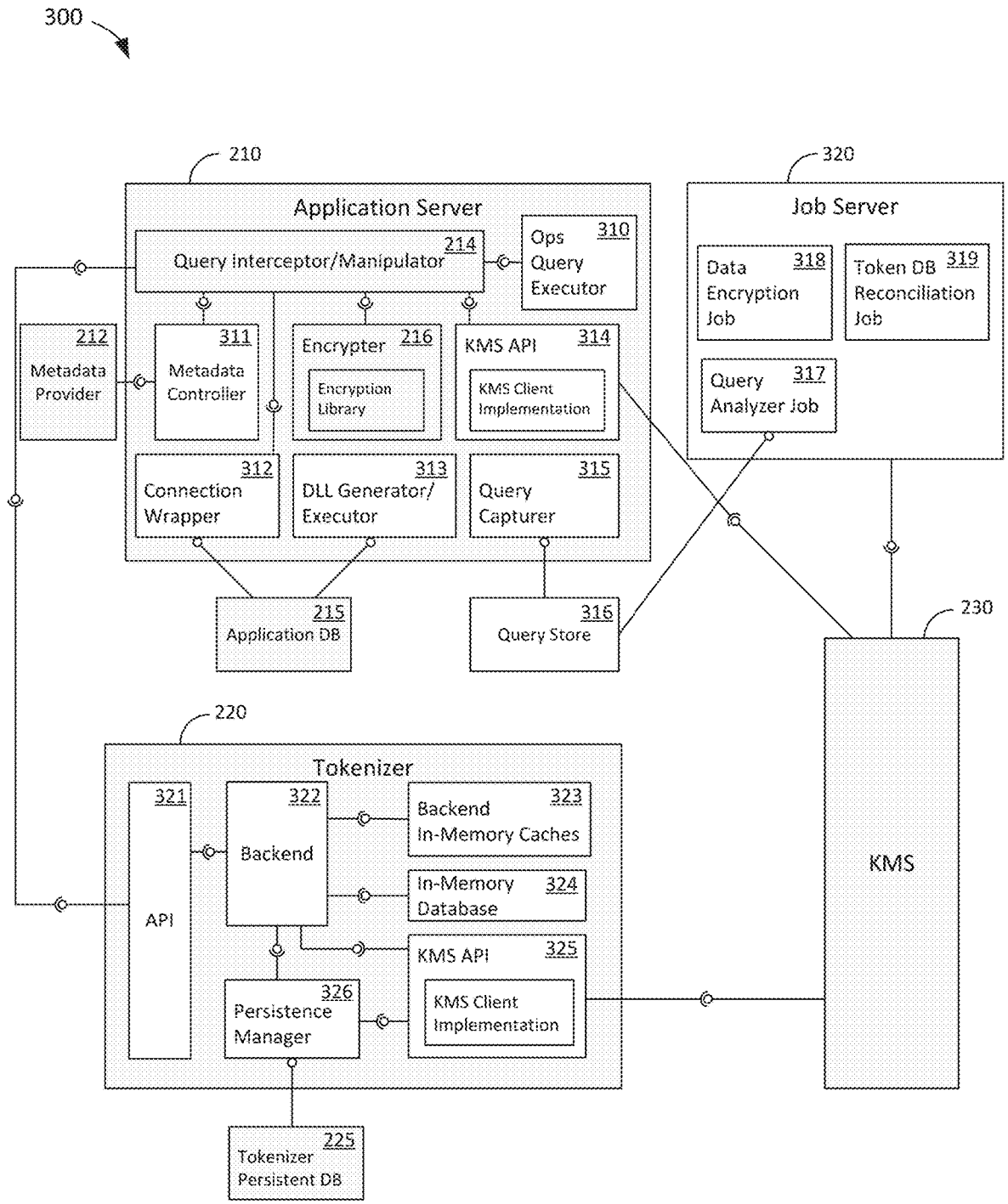
FIG. 3 is a more detailed block diagram of the system of FIG. 2 in which illustrative subcomponents of the system and their relationships to each other are shown.

FIGS. 2 and 3 will be discussed together. FIG. 2 is a block diagram of a data center architecture 200 according to some embodiments. Architecture 200 includes an application server 210, tokenizer 220, and key management store (KMS) 230, each running on a host device (e.g., Linux host), which correspond, respectively, to server 130, tokenizer 150, and KMS 160 in FIG. 1 and are generally as described above with respect to FIG. 1. Furthermore, application server 210 includes a metadata provider 212 coupled to an interceptor 214 having an encrypter 216. A firewall 240 is disposed between the client-side and the server-side (e.g., data center). Secure Socket Layer (SSL) protocol is used for internal data center communication to provide encrypted communications and is based on internal certificates.

FIG. 3 is a more detailed block diagram of the system of FIG. 2 in which illustrative subcomponents of the system and their relationships to each other are shown. Architecture 300 includes an application server 210 (along with metadata provider 212, interceptor 214, encrypter 216, and application database 215), tokenizer 220 (along with tokenizer DB 225), and key management store (KMS) 230, as in FIG. 2. Architecture 300 also includes job server 320.

In the application server 210, metadata provider 212 provides metadata (data that describes other data) that may be used by query interceptor 214 to identify which data (e.g., columns) in a database are to be encrypted and what the encryption scheme should be for each data (e.g., column). Metadata provider 212 provides the capability to pinpoint, for each column in a database, how to encrypt it and what functionality will be used on it.

Encrypter 216 is responsible for encryption/decryption of data using different encryption schemes. Encryption algorithms provided as encryption libraries by any vendor may be used by the encrypter 216. In some embodiments, encryption is done using customer controlled encryption keys. Encrypter 216 takes plaintext, encrypts it in one or more ways, and stores those values of plaintext and ciphertext in tokenizer 220.

Columns are encrypted using the appropriate encryption scheme required to support the operations performed on it. If a column supports only equality/inequality comparisons, for example, then a deterministic encryption scheme may be used to encrypt the column. Deterministic encryption is a type of encryption which always produces the same ciphertext for a given plaintext and key, even over separate executions of the encryption algorithm. On the other hand, if a column supports order by, or range comparison, for example, then an order preserving encryption (OPE) scheme may be used to encrypt the column.

Metadata is generated by capturing and parsing the queries executed by the application. The metadata may include information about columns that need to be encrypted (e.g., columns having PII data), the operations (e.g., SQL operations) being performed on those columns (e.g., Equals, Like, Lower, OrderBy), and the corresponding encryption schemes to be used to support those operations. In some embodiments, columns which are not PII data may be left as-is, avoiding additional overhead.

In some embodiments, a metadata controller 311 may be used (e.g., over a storage area network) for managing file locking, space allocation, and data access authorization to keep data private.

Data Definition Language (DDL) generator/executor 313 generates and executes DDL statements for increasing column size. DDLs for the addition of new columns may be generated and executed on enablement of encryption. The new columns are added to existing tables for storing encrypted values. In some embodiments, the DDL generator/executor 313 computes, based on metadata, how many new columns need to be added and executes those DDL statements on the database to add those columns. The query interceptor 214 can then insert encrypted values into those columns using the different algorithms as described by the metadata.

In some embodiments, there may be multiple encrypted columns for a single original column that support different SQL operations. For example, different encryption schemes may be needed to support different operations such as ORDER BY, SUM, etc., being performed on a single column, thus requiring one column per encryption scheme.

In some embodiments, for every encrypted column (not encrypted using AES256), a column is added to store the AES encrypted value. In this way, decryption can occur on this column since AES decryption is faster compared to other (e.g., OPE) decryption.

In some embodiments, a key ID (e.g., of the key used for encryption) is added for every encrypted value. The keyID is used by a reencryption process during key rotation to identify the values to be reencrypted.

Query interceptor 214, coupled to metadata provider 212, is executable in application server 210 and intercepts queries (e.g., SQL queries) fired from the application server 210. In some embodiments, query interceptor 214 reads metadata provided by metadata provider 212, takes a query coming from the application server 210, on its way down to the application database 215, and intercepts (e.g., holds) the process at connection wrapper 312 (e.g., at the JDBC layer).

In some embodiments, application database 215 (also herein referred to as "application DB" or "encrypted DB") is embodied as non-volatile (e.g., disk-based) memory in which encrypted values are stored.

Query interceptor 214 calls metadata provider 212 to determine which columns require encryption/decryption. Query interceptor 214 retrieves encryption keys from KMS 230. Query interceptor 214 calls encrypter 216 for encrypting/decrypting data, passing the key. Once the query interceptor 214 obtains the keys from KMS 230, those keys may be used at the tokenizer 220.

In some embodiments, when requested by engineering, select/update queries are executed for analyzing/fixing customer issues directly on the DB. Ops Query Executor 310 routes such queries via the Query Interceptor/Manipulator 214.

Tokenizer 220 runs on its own host (e.g., Linux host). Internal users of an organization do not have access to this host. Internal users would not be able to access or open it.

Tokenizer API 321 facilitates operations between application server 210 and tokenizer 220.

Tokenizer 220 at backend 322 includes backend in-memory caches 323 which caches tokens to be handled (e.g., ColumnName, Set <token>). The mappings (e.g., of plaintext strings to encrypted values) in tokenizer 220 are stored in an in-memory database (e.g., HyperSQL Database ("HSQLDB")) 324 on which queries are executed. In this way, plaintext is maintained in the tokenizer 220, preserving the ability to search over the data. Persistence manager 326 controls the data traffic to data store 225.

Additionally or alternatively, in a case where the tokenizer has been stopped, the mappings between plaintext and ciphertext in the tokenizer is written into a store in such an encrypted manner that no one can read the information written on it. For example, in a case where the system 200 is taken down for maintenance, data in tokenizer 220 may be encrypted using Advanced Encryption Standard (AES) encryption (e.g., AES 256) or the like, and a customer encryption key, and then written to data store 225 (e.g., tokenizer persistent DB, database file, disk, etc.). Tokenizer 220 reads, decrypts, and loads the persisted data in-memory when the token server is started. In this way, security of the data may be maintained by limiting the exposure of the data in unencrypted form (e.g., in-memory in the tokenizer when the tokenizer is up and running). Also, the tokenizer may be restarted without loss of the mappings.

Additionally or alternatively, data store 225 for tokenizer 220 may reside outside data center 200 at a customer's premise (e.g., customer-side persistent store, another cloud system, etc.), on the other side of firewall 240. This is because some organizations (e.g., banks) may prefer this data, even if encrypted, to be stored in their own data centers. In this case, when a tokenizer process is started, tokenizer 220 reads data from the database 225 before accepting client calls. Communication to the customer-side persistent stores may be based on customer provided authentication details.

KMS 230 provides customer keys via a network using a secure protocol such as Key Management Interoperability Protocol (KMIP). KMS 230 supports key rotation without any downtime. KMS API 314 facilitates operations between application server 210 and KMS 230 and between tokenizer 220 and KMS 230.

Additionally or alternatively, KMS 230 along with its data store 235 may reside outside data center 200 at a customer's premise (e.g., customer-side persistent store, another cloud system, etc.), on the other side of firewall 240.

Query capturer 315 captures the queries being executed by the application server 210 and stores them in query store 316, from where the queries can later be analyzed. At job server 320, query analyzer job 317 analyzes the captured queries from query store 324 to construct metadata about which query operations (e.g., SQL operations) are being applied to the encrypted columns. This metadata is used by the DDL generator/executor 313 and encrypter 216.

Data encryption job 318 is responsible for performing the encryption when encryption is enabled for a customer. In some embodiments, the data encryption job 318 will be scheduled to execute for a certain duration at a certain frequency until all existing data has been encrypted. In some embodiments, the progress of data encryption job 318 is saved for every execution so that it can start where it left off the next time it is executed.

Query interceptor 214 references the encryption status logged by the data encryption job 318 to modify the query appropriately. For example, if initial encryption is in progress for a table which is being queried, then interceptor will modify the query to include both plaintext and encrypted columns.

With time, the number of entries in token DB 225 which do not exist in encrypted DB 215 will increase. For example, when the value in an encrypted column is updated, then the new value will get stored in token DB 225 but the old value will not be deleted. Token database reconciliation job 319 cleans up such data from the token DB 225. Token database reconciliation job 319 will execute for a specific duration at a specific frequency so that it does not hold up resources for a long time.

Figure 4:
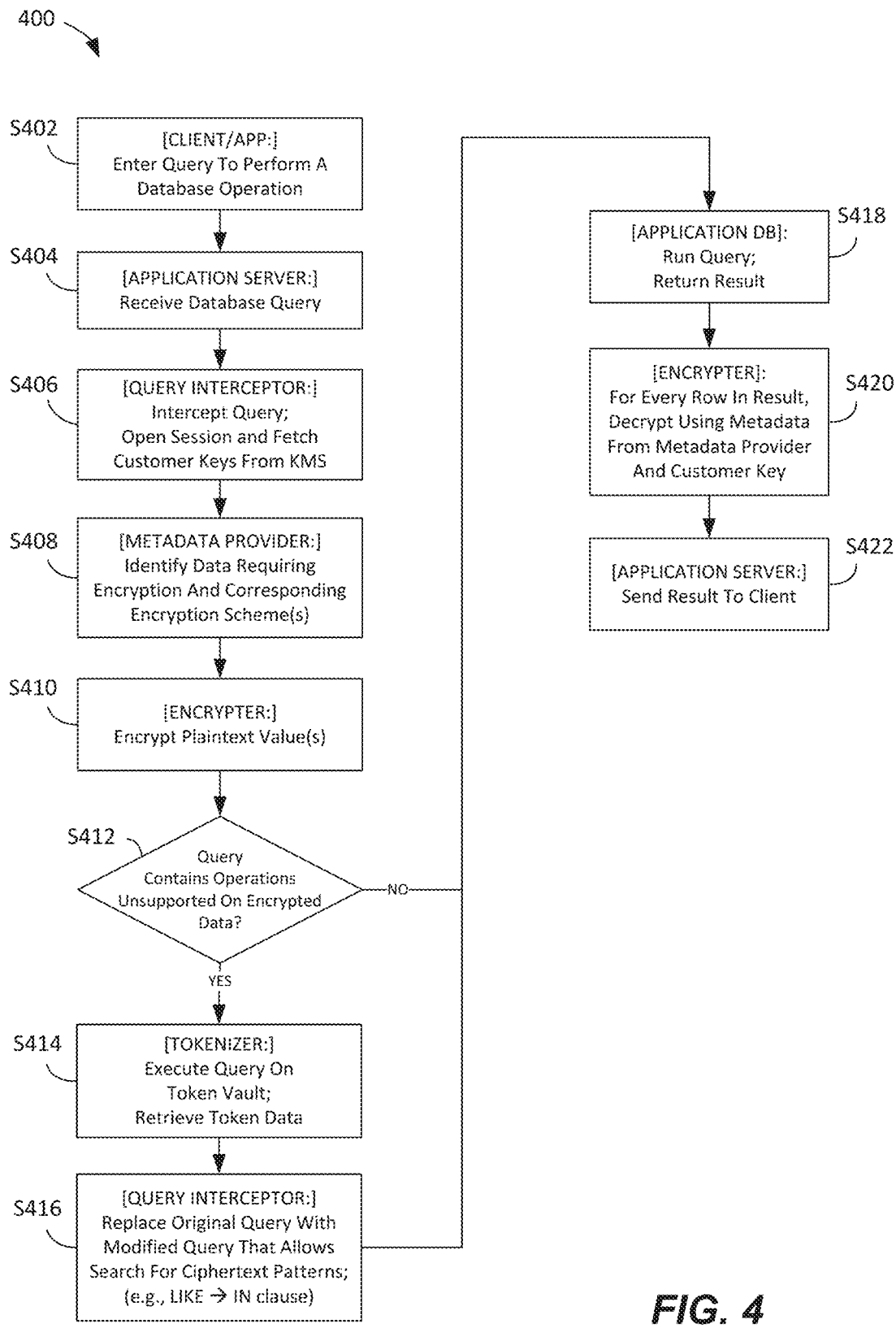
FIG. 4 is a flow diagram illustrating an exemplary process according to some embodiments.

FIG. 4 is a flow diagram illustrating an exemplary process 400 according to some embodiments.

Initially, at S402, a user logs onto an application (e.g., using a Web browser at a client) and enters a query to perform one or more operations on an encrypted database that triggers communication with an application server. The client may include any type of computing device such as a laptop, a tablet, a mobile phone, an appliance, a desktop computer, and the like.

Traffic flows to the application server which, at S404, receives the database query via HTTP, HTTPS, and/or WebSocket. The query may include a query for PII data (e.g., data that is to be encrypted).

A connection wrapper receives the query, which is intercepted at S406, by the query interceptor. The interceptor creates a new session for the query and fetches customer-specific key(s) from the KMS server.

The metadata provider, at S408, determines that a set of data referenced by the query includes data (e.g., PII data) that is to be encrypted and identifies, based on metadata, one or more data columns of the data that is to be encrypted as well as an encryption scheme to be applied to each data columns.

At S410, plaintext value(s) in each of the identified data columns are encrypted based on the identified encryption scheme to produce encrypted data.

Not all searches will need to make use of the tokenizer. A determination is made, at S412, as to whether the query contains one or more operations that are unsupported on encrypted data (e.g., cannot be executed on encrypted data). In a case where a determination is made, at S412, that the query contains one or more operations that are unsupported on encrypted data (e.g., a LIKE operation), the one or more operations of the query are executed on plaintext values in a token vault, which provides mappings of plaintext to ciphertext. The tokenizer outputs an encrypted response containing the token, which references the encrypted data.

In a case where a determination is made, at S412, that the query contains one or more operations that are supported on encrypted data (e.g., an equality search), the one or more operations of the query are executed directly on an encrypted database (e.g., application DB).

In some embodiments, for data columns that are not searchable, those columns will be encrypted/decrypted using AES256 with the customer key with no additional logic involved.

Then, at S416, the query is replaced with a modified query at the query interceptor that allows search for ciphertext patterns (e.g., LIKE→IN clause) in an encrypted database.

This query is executed on the encrypted database (e.g., application DB), at S418, and a result is returned including information on the queried columns in the database. For every row in the result, at S420, the query interceptor decrypts the encrypted values into plaintext values using the metadata from the metadata provider and the customer key.

The database search results are then passed up to the application server, at S422, and returned to the client side (e.g., presented to the user).

Among other things, logic is implemented that intercepts queries (e.g., SQL queries) as they are transmitted from client applications, changes the queries in order to facilitate searching over, sorting over, etc., as desired.

The query (e.g., SQL) is modified at runtime by the interceptor to read/write data from/to encrypted columns instead of plaintext columns. The interceptor encrypts the values before inserting/updating them and decrypts the values after retrieving (e.g., SELECT query) them from the database.

Figure 5:
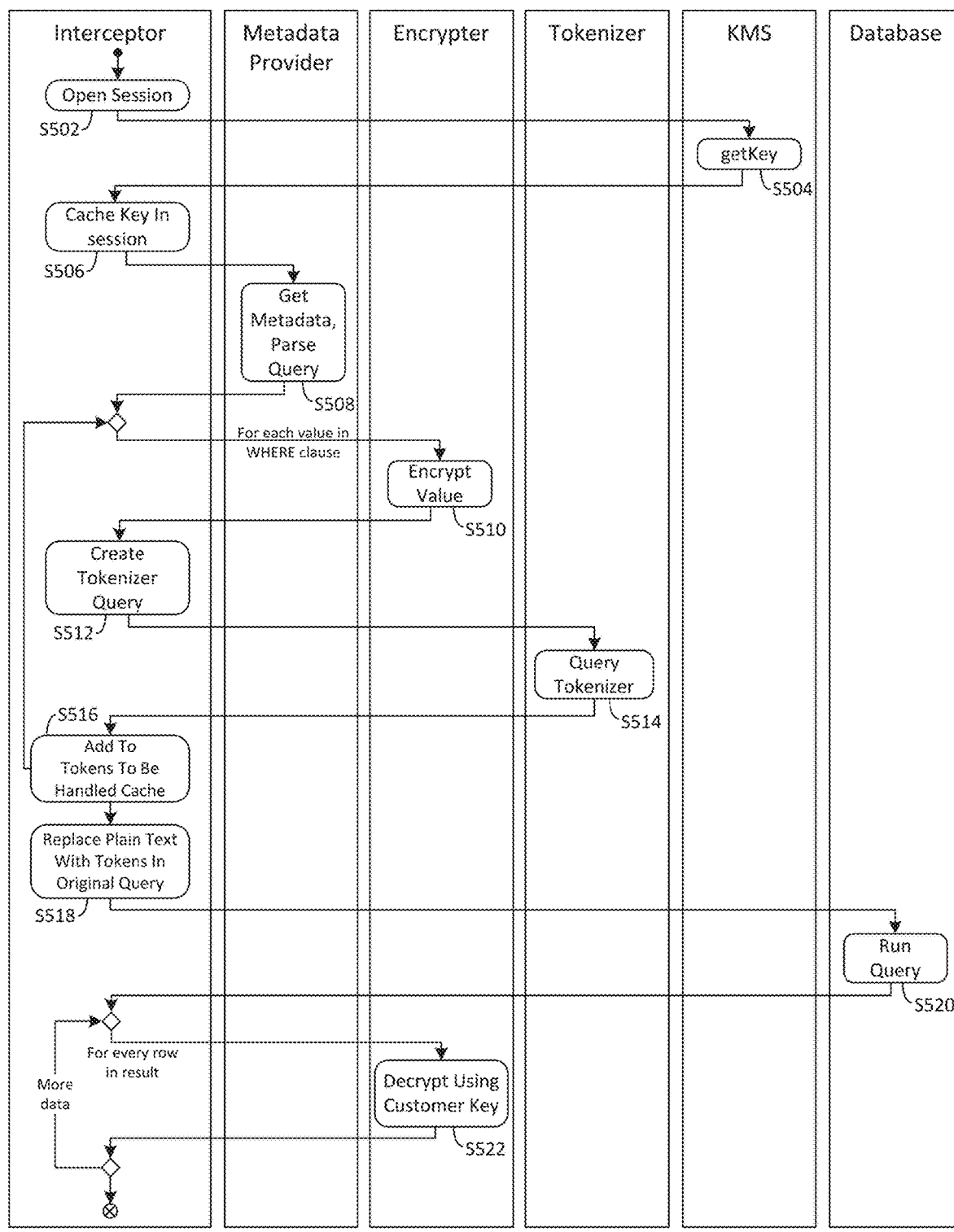
FIG. 5 is a sequence diagram of a use case according to some embodiments.

FIG. 5 is a sequence diagram of a use case according to some embodiments.

For purposes of illustration, consider the example query in SQL which seeks to:

```
SELECT user_name FROM users_sys_info WHERE
(users_syst_firstname LIKE
%<search term>% AND users_sys_lastname = <search term2>)
```

In this example, a LIKE operator is used in a WHERE clause to search for a specified pattern in a column is operated on one column (e.g., "firstname" column). In addition, an equal (=) operator is used in the WHERE clause to search for a specified pattern in another column is operated on a second column (e.g., "lastname" column). Both columns contain PII data.

A query is received, which is intercepted at S502, by the query interceptor (e.g., at the JDBC layer). The interceptor creates a new session for the query and fetches customer-specific key(s) from the KMS server at S504. Additionally or alternatively, this key may be cached in the session, at S506, so that if in the same session more encryption or decryption operations are required, the key need not be fetched from the KMS every time because it has been cached.

The metadata provider, at S508, identifies which data (e.g., columns) are to be encrypted (e.g., PII data columns) and what the encryption scheme should be for each data (e.g., column). For each value in the WHERE clause, the identified columns are encrypted at S510.

At S512, interceptor creates a tokenizer query for the LIKE operation. Not all searches will need to make use of the tokenizer. For example, for the equality (=) operation on the "lastname" column, the tokenizer is not required because equality searches can be fired directly on encrypted data in the encrypted database, given that the column is using deterministic encryption.

The LIKE operation is executed on plaintext values in the token vault. Using the plaintext values, the encrypted values corresponding to the plaintext value may be searched in the token vault, and acquired at S514. An example is the query:

```
SELECT encryptedValue FROM TokenVault WHERE tableName =
users_sys_info
AND columnName = users_firstname AND plaintext LIKE
%<search term 1>%.
```

Suppose, for example, the search returns four encrypted values: Token1, Token2, Token3, and Token 4.

If there are additional columns to be handled, each token may be added to an in-memory cache in the tokenizer at S516, as described above.

The retrieved encrypted values are looked up (e.g., using an "IN" or equals operator) in the encrypted database to retrieve the rows.

At S518, for incoming queries, the query interceptor replaces the original query with an equivalent query making use of the tokenized data. For example, a LIKE '%%' clause used in the original SQL is replaced with an IN (Token 1, Token2, Token 3 . . . ) SQL clause. An example is the following modified query:

```
SELECT user_name from users_sysinfo WHERE
(users_sys_firstname_enc IN
(Token 1, Token 2, Token 3, Token 4) AND users_sys_lastname_enc =
<encryptedValue>
```

At S520, after the tokenizer processes the LIKE operator on the "first name" column and has returned the matching encrypted values, the modified query is fired on the database.

For fetched results sets, the encrypter, using the customer's key, at S522, replaces each row's encrypted values with the corresponding plaintext string. For example, if a column value returns Token1, it replaces the value in the result set with decrypt(Token1).

Figure 6:
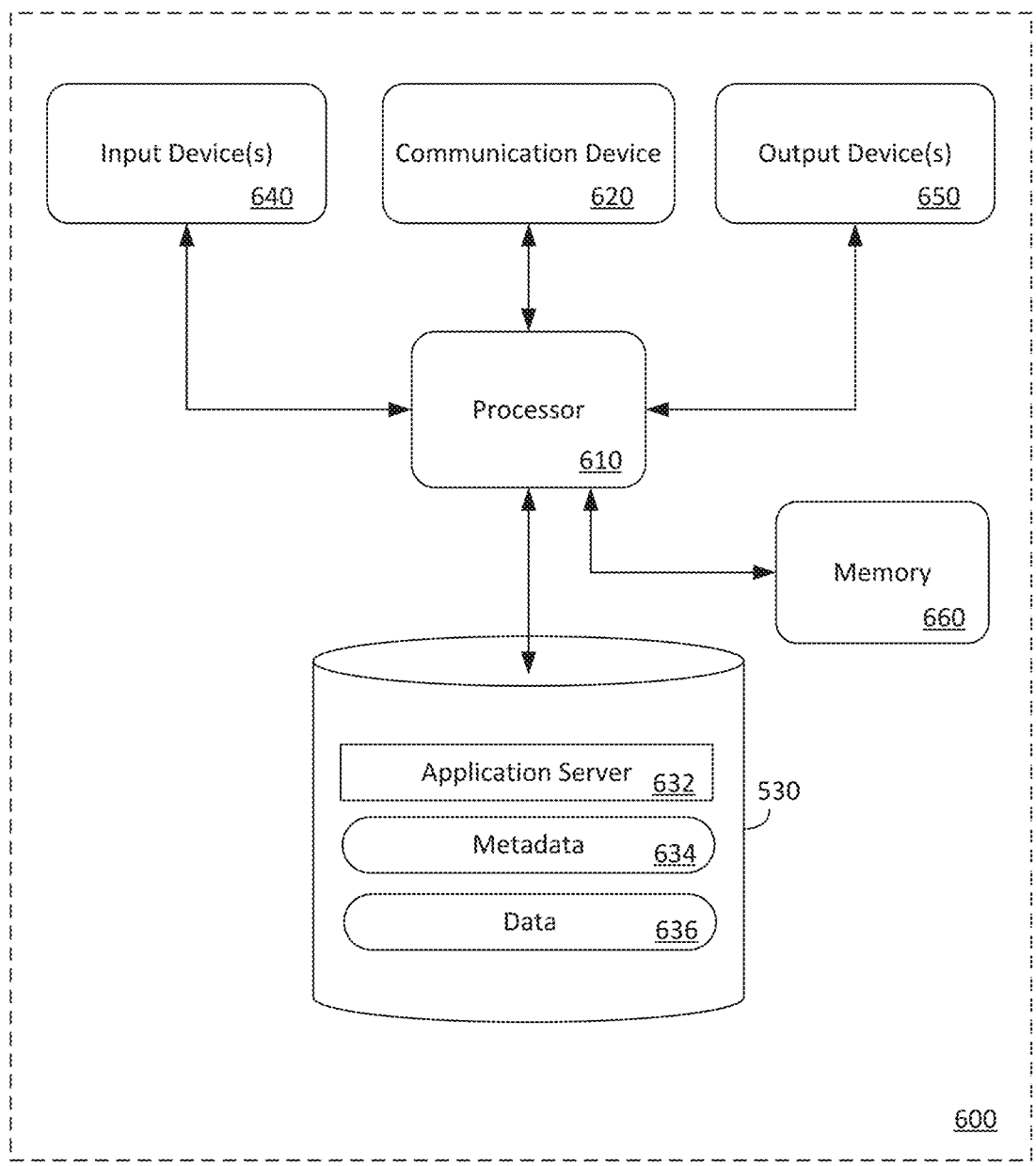
FIG. 6 is a block diagram of an apparatus according to some embodiments.

FIG. 6 is a block diagram of apparatus 600 according to some embodiments. Apparatus 600 may comprise a general- or special-purpose computing apparatus and may execute program code to perform any of the functions described herein. Apparatus 600 may comprise an implementation of one or more elements of architectures 100, 200, and 300. Apparatus 600 may include other unshown elements according to some embodiments.

Apparatus 600 includes processor 610 operatively coupled to communication device 620, data storage device 530, one or more input devices 640, one or more output devices 650, and memory 660. Communication device 620 may facilitate communication with external devices, such as an application server 632. Input device(s) 640 may comprise, for example, a keyboard, a keypad, a mouse or other pointing device, a microphone, knob or a switch, an infrared (IR) port, a docking station, and/or a touch screen. Input device(s) 640 may be used, for example, to manipulate graphical user interfaces and to input information into apparatus 600. Output device(s) 650 may comprise, for example, a display (e.g., a display screen) a speaker, and/or a printer.

Data storage device 530 may comprise any appropriate persistent storage device, including combinations of magnetic storage devices (e.g., magnetic tape, hard disk drives and flash memory), optical storage devices, Read Only Memory (ROM) devices, etc., while memory 660 may comprise Random Access Memory (RAM).

Application server 632 may comprise program code executed by processor 610 to cause apparatus 600 to perform any one or more of the processes described herein. Embodiments are not limited to execution of these processes by a single apparatus.

Metadata 634 and data 636 (either cached or a full database) may be stored in volatile memory such as memory 660. Data storage device 530 may also store data and other program code for providing additional functionality and/or which are necessary for operation of apparatus 600, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A computer-implemented method comprising:
receiving, at an application server, a first query to perform one or more operations on a database;
intercepting the first query;
parsing the first query to determine metadata;
determining, based on the metadata, whether a set of data of the database referenced by the first query includes data that is to be encrypted;
in response to determining that the set of data does not include data that is to be encrypted, executing the first query on the database to retrieve a query result; and
in response to determining that the set of data includes data that is to be encrypted:
identifying, based on the metadata, one or more data columns of the data that is to be encrypted and, for each of the one or more data columns, determining an encryption scheme to be applied to the corresponding data column based on one or more operations determined to be supported by the corresponding data column;
encrypting each of the identified data columns based on the identified encryption scheme to produce encrypted data after the first query has been intercepted;
determining that one or more of the operations of the first query is supported or unsupported on encrypted data, and,
in response to determining that the one or more operations of the first query are supported on the encrypted data, executing the first query on the encrypted database; and
in response to determining that the one or more operations of the first query are unsupported on the encrypted data:
executing the one or more operations on a token vault to retrieve token data referencing the encrypted data;
replacing the first query with a modified query based on the retrieved token data; and
executing the modified query on the encrypted database to retrieve an encrypted query result.

2. The method of claim 1, wherein the set of data referenced by the first query includes personally identifiable information (PII) data.

3. The method of claim 1, wherein the first query is intercepted at a Java Database Connectivity (JDBC) layer.

4. The method of claim 1, wherein the modified query is a Structured Query Language (SQL) query.

5. The method of claim 1, wherein the first query includes a LIKE condition filter.

6. The method of claim 1, further comprising,
adding a new column, for each identified encryption scheme, to the set of data referenced by the first query; and
storing the encrypted data for each encryption scheme for the encrypted database in the new column.

7. The method of claim 1, further comprising decrypting the encrypted query result based on the metadata.

8. A system for facilitating a searchable encryption scheme, the system comprising:
a client device having a browser for accessing the server over a network;
a tokenizer; and
a server having a processor and a volatile memory, wherein, when executed, the server performs the operations of:
receiving a first query to perform one or more operations on a database;
intercepting the first query;
parsing the first query to determine metadata;
determining, based on the metadata, whether a set of data of the database referenced by the first query includes data that is to be encrypted;
in response to determining that the set of data does not include data that is to be encrypted, executing the first query on the database to retrieve a query result; and
in response to determining that the set of data includes data that is to be encrypted:
identifying, based on the metadata, one or more data columns of the data that is to be encrypted and, for each of the one or more data columns, determining an encryption scheme to be applied to the corresponding data column based on one or more operations determined to be supported by the corresponding data column;
encrypting each of the identified data columns based on the identified encryption scheme to produce encrypted data after the first query has been intercepted;
determining that one or more of the operations of the first query is supported or unsupported on encrypted data, and,
in response to determining that the one or more operations of the first query are supported on the encrypted data, executing the first query on the encrypted database; and
in response to determining that the one or more operations of the first query are unsupported on the encrypted data:
executing the one or more operations on a token vault to retrieve token data referencing the encrypted data;
replacing the first query with a modified query based on the retrieved token data; and
executing the modified query on the encrypted database to retrieve an encrypted query result.

9. The system of claim 8, wherein the set of data referenced by the first query includes personally identifiable information (PII) data.

10. The system of claim 8, wherein the first query is intercepted at a Java Database Connectivity (JDBC) layer.

11. The system of claim 8, wherein the modified query is a Structured Query Language (SQL) query.

12. The system of claim 8, wherein the first query includes a LIKE condition filter.

13. The system of claim 8, wherein the server further performs the operations of,
adding a new column, for each identified encryption scheme, to the set of data referenced by the first query; and
storing the encrypted data for each encryption scheme for the encrypted database in the new column.

14. The system of claim 8, wherein the server further performs the operation of decrypting the encrypted query result based on the metadata.

15. A non-transitory computer readable medium having stored therein instructions that when executed cause a computer to perform a method comprising:
receiving, at an application server, a first query to perform one or more operations on a database;
intercepting the first query;
parsing the first query to determine metadata;
determining, based on the metadata, whether a set of data of the database referenced by the first query includes data that is to be encrypted;
in response to determining that the set of data does not include data that is to be encrypted, executing the first query on the database to retrieve a query result; and
in response to determining that the set of data includes data that is to be encrypted:
identifying, based on the metadata, one or more data columns of the data that is to be encrypted and an encryption scheme to be applied to the corresponding data column based on one or more operations determined to be supported by the corresponding data column;
encrypting each of the identified data columns based on the identified encryption scheme to produce encrypted data after the first query has been intercepted;
determining that one or more of the operations of the first query is supported or unsupported on encrypted data, and,
in response to determining that the one or more operations of the first query are supported on the encrypted data, executing the first query on the encrypted database; and
in response to determining that the one or more operations of the first query are unsupported on the encrypted data:
executing the one or more operations on a token vault to retrieve token data referencing the encrypted data;
replacing the first query with a modified query based on the retrieved token data; and
executing the modified query on the encrypted database to retrieve an encrypted query result.

16. The non-transitory computer-readable medium of claim 15, wherein the first query is intercepted at a Java Database Connectivity (JDBC) layer; and the set of data referenced by the first query includes personally identifiable information (PII) data.

17. The non-transitory computer-readable medium of claim 15, further comprising,
adding a new column, for each identified encryption scheme, to the set of data referenced by the first query; and
storing the encrypted data for each encryption scheme for the encrypted database in the new column.

* * * * *